(12) United States Patent
Chen et al.

(10) Patent No.: US 10,520,130 B2
(45) Date of Patent: Dec. 31, 2019

(54) ANGLE SENSING DEVICE AND GIMBAL PLATFORM ADOPTING THE SAME

(71) Applicant: SZ DJI OSMO TECHNOLOGY CO., LTD., Shenzhen (CN)

(72) Inventors: Zihan Chen, Shenzhen (CN); Dahu Pan, Shenzhen (CN); Qilong Yan, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 170 days.

(21) Appl. No.: 15/700,595

(22) Filed: Sep. 11, 2017

(65) Prior Publication Data

US 2018/0010729 A1    Jan. 11, 2018

Related U.S. Application Data

(63) Continuation of application No. PCT/CN2015/073997, filed on Mar. 11, 2015.

(51) Int. Cl.
| | |
|---|---|
| *F16M 11/18* | (2006.01) |
| *G05D 3/00* | (2006.01) |
| *G01B 7/30* | (2006.01) |
| *G01D 11/24* | (2006.01) |

(52) U.S. Cl.
CPC ............ *F16M 11/18* (2013.01); *G01B 7/30* (2013.01); *G01D 11/245* (2013.01); *G05D 3/00* (2013.01)

(58) Field of Classification Search
None
See application file for complete search history.

(56) References Cited

U.S. PATENT DOCUMENTS

| | | | |
|---|---|---|---|
| 4,136,962 A | | 1/1979 | Brouwer et al. |
| 4,689,990 A | * | 9/1987 | Hofler .................. G01P 3/481 340/671 |
| 5,613,571 A | * | 3/1997 | Rank .................... B60K 28/14 180/219 |

(Continued)

FOREIGN PATENT DOCUMENTS

| | | |
|---|---|---|
| CN | 201820146 U | 5/2011 |
| CN | 203490352 U | 3/2014 |

(Continued)

OTHER PUBLICATIONS

The World Intellectual Property Organization (WIPO) International Search Report for PCT/CN2015/073997 dated Sep. 2, 2015 6 Pages.

*Primary Examiner* — Paul M. West
*Assistant Examiner* — Mark A Shabman
(74) *Attorney, Agent, or Firm* — Anova Law Group, PLLC (57) ABSTRACT

Disclosed are angle sensing devices and gimbal platforms adopting the same. One angle sensing device disclosed herein comprises: a rear cover provided with an upper fitting face; a bracket provided with a lower fitting face, the lower and upper fitting faces being arranged to face each other and spaced apart from each other by a pre-set spacing; and a sensor mounting plate for mounting an angle sensor; wherein the sensor mounting plate is provided between the upper and lower fitting faces, and the pre-set spacing is greater than the thickness of the sensor mounting plate, such that the sensor mounting plate is movable between the upper and lower fitting faces.

19 Claims, 6 Drawing Sheets

(56) References Cited

U.S. PATENT DOCUMENTS

| | | | | |
|---|---|---|---|---|
| 5,798,639 | A * | 8/1998 | McCurley | G01D 5/145 123/617 |
| 5,811,968 | A * | 9/1998 | Nakazawa | G01D 5/145 123/617 |
| 6,472,865 | B1 * | 10/2002 | Tola | G01B 7/30 324/207.12 |
| 2002/0067160 | A1 * | 6/2002 | Oomkes | G01D 5/145 324/207.2 |
| 2003/0008746 | A1 * | 1/2003 | Meier | H02K 11/215 475/149 |
| 2008/0218158 | A1 * | 9/2008 | Carlson | G01D 5/145 324/207.2 |
| 2010/0207616 | A1 | 8/2010 | Wolschlager et al. | |
| 2011/0113874 | A1 | 5/2011 | Park et al. | |
| 2013/0241539 | A1 * | 9/2013 | Wolschlager | G01D 1/00 324/207.25 |

FOREIGN PATENT DOCUMENTS

| | | |
|---|---|---|
| CN | 104075084 A | 10/2014 |
| CN | 203927268 U | 11/2014 |
| CN | 204145156 U | 2/2015 |
| CN | 204155050 U | 2/2015 |
| JP | 2003047204 A | 2/2003 |
| JP | 2004301685 A | 10/2004 |

* cited by examiner

ANGLE SENSING DEVICE AND GIMBAL PLATFORM ADOPTING THE SAME

CROSS-REFERENCE TO RELATED APPLICATION

This is a continuation application of International Application No. PCT/CN2015/073997, filed on Mar. 11, 2015, the entire contents of which are incorporated herein by reference.

TECHNICAL FIELD

The present disclosure generally relates to an angle sensing device, and more particularly, to angle sensing devices for sensing a rotation angle of a drive shaft of a motor, and to gimbal platforms adopting the angle sensing devices.

BACKGROUND

In a traditional angle sensing device of a gimbal platform, a potentiometer is integrated as an angle sensor into an electronic speed control board. In order to fix the electronic speed control board, a rotary shaft mechanism adopts a bracket and a rear cover to clamp the electronic speed control board, and the periphery of the electronic speed control board is exposed outside the bracket and the rear cover.

However, the rotary shaft mechanism of the above-mentioned angle sensing device is likely to cause excessive positioning of the potentiometer such that the drive shaft of the motor of the gimbal platform is not concentric with a detection hole of the potentiometer, so that there is a relatively large stress between the drive shaft of the motor of the gimbal platform and the angle sensor, thereby resulting in problems such as non-smooth rotation of the motor and adverse effects on positioning precision, etc. Therefore, during production and assembly, there is a need to add specific stations to adjust the positioning precision between the drive shaft of the motor and the angle sensor, which increases the production costs.

SUMMARY

In view of this, an angle sensing device is provided, which is capable of effectively reducing the stress between a drive shaft of a motor and an angle sensor on a sensor mounting plate, and reducing the production costs of the gimbal platform.

An angle sensing device disclosed by this disclosure comprising:

a rear cover provided with an upper fitting face;

a bracket provided with a lower fitting face, the lower and upper fitting faces being arranged to face each other and spaced apart from each other by a pre-set spacing; and a sensor mounting plate for mounting an angle sensor;

wherein the sensor mounting plate is provided between the upper and lower fitting faces, and the pre-set spacing is greater than the thickness of the sensor mounting plate, such that the sensor mounting plate is movable between the upper and lower fitting faces.

In one embodiment, the sensor mounting plate is a circuit board which is further provided with a control circuit for controlling a rotation angle of a drive shaft of a motor.

In one embodiment, the rear cover is provided with a stepped part for mounting a motor, and the stepped part is arranged to face away from the sensor mounting plate.

In one embodiment, the stepped part comprises a bottom face and a side face connected perpendicularly to the bottom face, and the shape of the side face matches the shape of the periphery of the motor.

In one embodiment, the side face is provided with a threading hole for a flexible circuit board to pass therethrough, the flexible circuit board being used for electrically connecting to the motor.

In one embodiment, the height at which the bottom face is located is lower than the height of the rear cover.

In one embodiment, the rear cover is provided with a limiting part, the sensor mounting plate is provided with a fitting part, and the limiting part is fitted with the fitting part so as to limit a rotation angle of the sensor mounting plate between the bracket and the rear cover.

In one embodiment, the limiting part is a limiting groove provided in the rear cover, and the fitting part is a fitting boss provided on an edge of the sensor mounting plate.

In one embodiment, the bracket comprises a first support arm and a second support arm connected fixedly and perpendicularly to one end of the first support arm, the first support arm and the rear cover are arranged to face each other, and a motor mounting part for mounting a motor is provided on the second support arm.

In one embodiment, the motor mounting part is a mounting groove, and the shape of the mounting groove matches the shape of the bottom part of the motor.

In one embodiment, the rear cover is provided with an upper accommodating groove, the bracket is provided with a lower accommodating groove, and the lower and upper accommodating grooves are arranged to face each other.

In one embodiment, the upper fitting face is provided at the bottom part of the upper accommodating groove, the lower fitting face is provided at the bottom part of the lower accommodating groove, and the lower and upper accommodating grooves together form an accommodating cavity for accommodating the sensor mounting plate.

In one embodiment, the upper fitting face is provided on the periphery of an opening of the upper accommodating groove, and the lower fitting face is provided on the periphery of an opening of the lower accommodating groove.

In one embodiment, the angle sensor is further provided with a detection hole for a drive shaft of a motor to pass therethrough.

A gimbal platform comprising:
the above-mentioned angle sensing device; and
a motor mounted on the rear cover;
wherein the angle sensor is arranged close to a drive shaft of the motor and used for sensing a rotation angle of the drive shaft of the motor.

An angle sensing device comprising:
a rear cover;
a bracket arranged to face the rear cover and fixedly connected thereto via a connecting shaft; and
a sensor mounting plate for mounting an angle sensor, the sensor mounting plate being provided with a limiting hole;
wherein the sensor mounting plate is provided between the rear cover and the bracket, and the connecting shaft passes through the limiting hole such that the sensor mounting plate is movably sheathed on the connecting shaft.

In one embodiment, the sensor mounting plate is a circuit board which is further provided with a control circuit for controlling a rotation angle of a drive shaft of a motor.

In one embodiment, the rear cover is provided with a stepped part for mounting a motor, and the stepped part is arranged to face away from the sensor mounting plate.

In one embodiment, the stepped part comprises a bottom face and a side face connected perpendicularly to the bottom face, and the shape of the side face matches the shape of the periphery of the motor.

In one embodiment, the height at which the bottom face is located is lower than the height of the rear cover.

In one embodiment, the side face is provided with a threading hole for a flexible circuit board to pass therethrough, the flexible circuit board being used for electrically connecting to the motor.

In one embodiment, the rear cover is provided with a limiting part, the sensor mounting plate is provided with a fitting part, and the limiting part is fitted with the fitting part so as to limit a rotation angle of the sensor mounting plate between the bracket and the rear cover.

In one embodiment, the limiting part is a limiting groove provided in the rear cover, and the fitting part is a fitting boss provided on an edge of the sensor mounting plate.

In one embodiment, the bracket comprises a first support arm and a second support arm connected fixedly and perpendicularly to one end of the first support arm, the first support arm and the rear cover are arranged to face each other, and a motor mounting part for mounting a motor is provided on the second support arm.

In one embodiment, the motor mounting part is a mounting groove, and the shape of the mounting groove matches the shape of the bottom part of the motor.

In one embodiment, the rear cover and the bracket together form an accommodating cavity for accommodating the sensor mounting plate, and the connecting shaft is located in the accommodating cavity.

In one embodiment, the rear cover and the bracket are arranged to face each other and spaced apart from each other.

In one embodiment, an elastic member is further provided, which abuts between the sensor mounting plate and the rear cover and/or the bracket.

In one embodiment, there is a pre-set gap between the sensor mounting plate and the rear cover and/or the bracket.

In one embodiment, the connecting shaft is a positioning post provided on one of the rear cover and the bracket, the other of the rear cover and the bracket is provided with a positioning hole, and the positioning post is fitted with the positioning hole.

In one embodiment, the positioning post abuts against the bottom part of the positioning hole, so as to ensure the pre-set spacing between the rear cover and the bracket.

In one embodiment, an end face of the positioning post is provided with a threaded hole, and a threaded fastener passes through the positioning hole to screw into the threaded hole, so as to connect the rear cover fixedly to the bracket.

In one embodiment, the angle sensor is further provided with a detection hole for a drive shaft of a motor to pass therethrough.

A gimbal platform, characterized by comprising:
the above-mentioned angle sensing device; and
a motor mounted on the rear cover;
wherein the angle sensor is arranged close to a drive shaft of the motor and used for sensing a rotational angle of the drive shaft of the motor.

The sensor mounting plate of the above-mentioned angle sensing device is provided between the rear cover and the bracket, and is movable therebetween; when there is interference between the drive shaft of the motor of the gimbal platform and the angle sensor on the sensor mounting plate, for example, when the drive shaft of the motor of the gimbal platform is not concentric with the detection hole of the angle sensor on the sensor mounting plate, the sensor mounting plate can be adjusted according to the actual error, so as to reduce the stress between the drive shaft of the motor and the angle sensor on the sensor mounting plate, and avoid the problems of non-smooth rotation of the motor and adverse effects on the positioning precision, etc., so that there is no need to add a specific station to adjust the positioning precision between the drive shaft of the motor and the angle sensor, thus reducing the production costs of the gimbal platform.

DESCRIPTION OF EMBODIMENTS

The technical solutions in the embodiments of the present disclosure are hereinafter described clearly in detail with reference to the accompanying drawings. Evidently, the described embodiments are only some rather than all of the embodiments of the present disclosure. All other embodiments obtained by a person of ordinary skill in the art based on the embodiments of the present disclosure without creative efforts shall fall within the scope of protection of the present disclosure.

It shall be explained that, when a component is known to be "fixed to" another component, it can be directly attached to another component, or there might be an intermediate component. When a component is considered to be "connected" to another component, it can be directly connected to another component or an intermediate component can be present at the same time. The terms "vertical", "horizontal", "left", "right" and similar expressions used herein are intended for the purposes of illustration only.

Unless otherwise defined, all technical and scientific terms used herein have the same meaning as commonly understood by one of ordinary skill in the related technical fields. The terms used in the description of the present disclosure are for the purpose of describing particular embodiments and are not intended to limit the present disclosure. The term "and/or" used herein includes any and all combinations of one or more of the associated listed items.

One embodiment of the present disclosure provides an angle sensing device for sensing a rotation angle of a rotary shaft, for example, for sensing a rotation angle of a drive shaft of a motor.

The angle sensing device comprises a rear cover, a bracket and a sensor mounting plate, the rear cover and the bracket are arranged to face each other, and the sensor mounting plate is movably provided between the rear cover and the bracket, so as to reduce the stress between the drive shaft of the motor and an angle sensor on the sensor mounting plate.

In some embodiments, the rear cover and the bracket are provided with a shaft hole for the drive shaft of the motor to pass therethrough, so as to facilitate the mounting of the motor and the positioning of the drive shaft of the motor.

In some embodiments, the sensor mounting plate is provided with a shaft hole for the drive shaft of the motor to pass therethrough, so as to facilitate the positioning of the drive shaft of the motor.

In some embodiments, the rear cover and the bracket are arranged to face each other and spaced apart from each other, and there is a pre-set gap between the sensor mounting plate and the rear cover and/or bracket, such that the sensor mounting plate is movable between the rear cover and the bracket.

In some embodiments, the pre-set gap may form a sealed space, for example, the rear cover and the bracket together form an accommodating cavity, the pre-set gap is formed between the opposite side walls of the accommodating cavity, and the mounting plate is accommodated in the accommodating cavity.

In some embodiments, the pre-set gap may also form an open space, the rear cover and the bracket are arranged to face each other and spaced apart from each other, the pre-set gap is formed between opposite surfaces of the rear cover and the bracket, and the periphery of the sensor mounting plate is exposed outside the rear cover and the bracket.

In some embodiments, the rear cover and the bracket are arranged to face each other and spaced apart from each other, and an elastic member, for example, an elastic rubber mat, an elastic rubber ring, a sponge mat or a sponge ring, is filled between the sensor mounting plate and the rear cover and/or bracket.

In some embodiments, the rear cover is fixedly connected to the bracket via a connecting shaft, and the sensor mounting plate is movably sheathed on the connecting shaft.

The above-mentioned angle sensing device can be applied to a gimbal platform, such as a uniaxial gimbal platform, a biaxial gimbal platform or a triaxial gimbal platform.

Some embodiments of the present disclosure will be further described in detail below in conjunction with the accompanying drawings. The embodiments below and the features in the embodiments may be combined with each other if there is no conflict.

Figure 1:
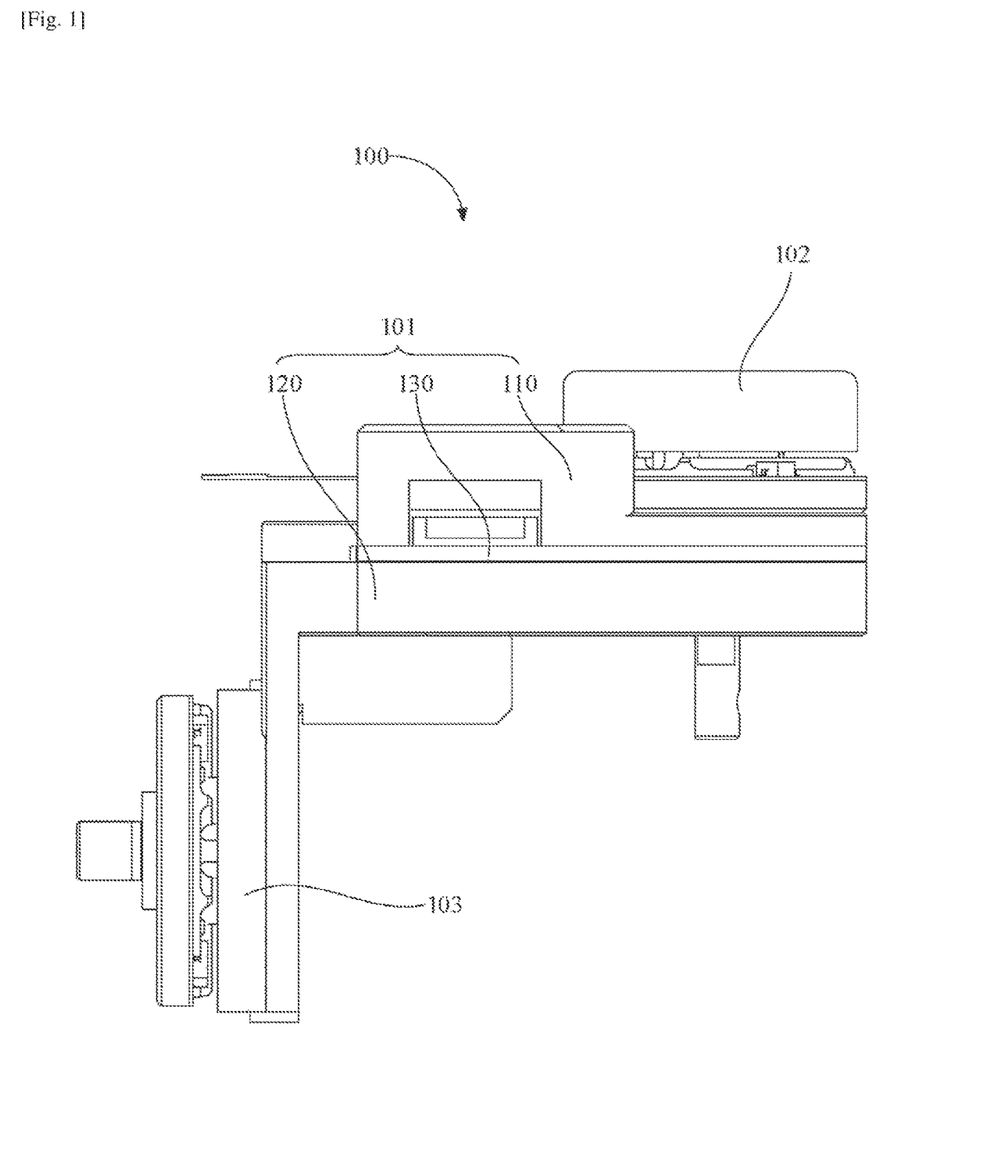
FIG. 1 is a structural schematic view of a rotary shaft mechanism of a gimbal platform according to a first embodiment of the present disclosure.

Reference is made to FIG. 1, a gimbal platform 100 of a first embodiment of the present disclosure comprises at least one rotary shaft mechanism. In this embodiment, the gimbal platform 100 of this embodiment is illustrated taking a three-axis gimbal platform as an example, and the rotary shaft mechanism of this embodiment is illustrated taking a pitch shaft as an example.

The rotary shaft mechanism comprises an angle sensing device 101, a first motor 102 and a second motor 103, the angle sensing device 101 being used for sensing a rotation angle of a drive shaft of the first motor 102. The angle sensing device 101 comprises a rear cover 110, a bracket 120 and a sensor mounting plate 130, the rear cover 110 and the bracket 120 are arranged to face each other, and the sensor mounting plate 130 is provided between the rear cover 110 and the bracket 120.

Figure 2:
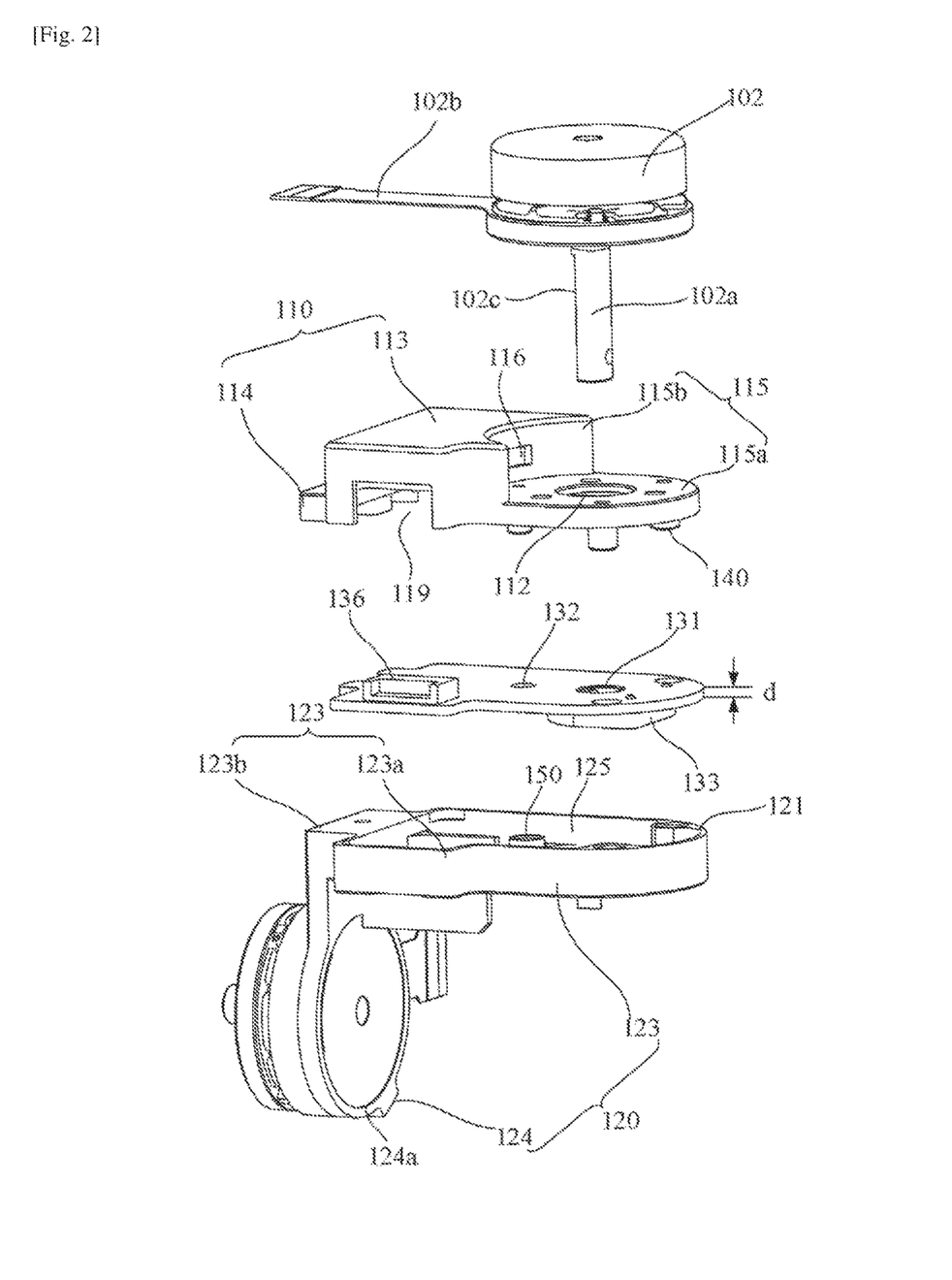
FIG. 2 is an exploded view of the rotary shaft mechanism of the gimbal platform as shown in FIG. 1.
Figure 3:
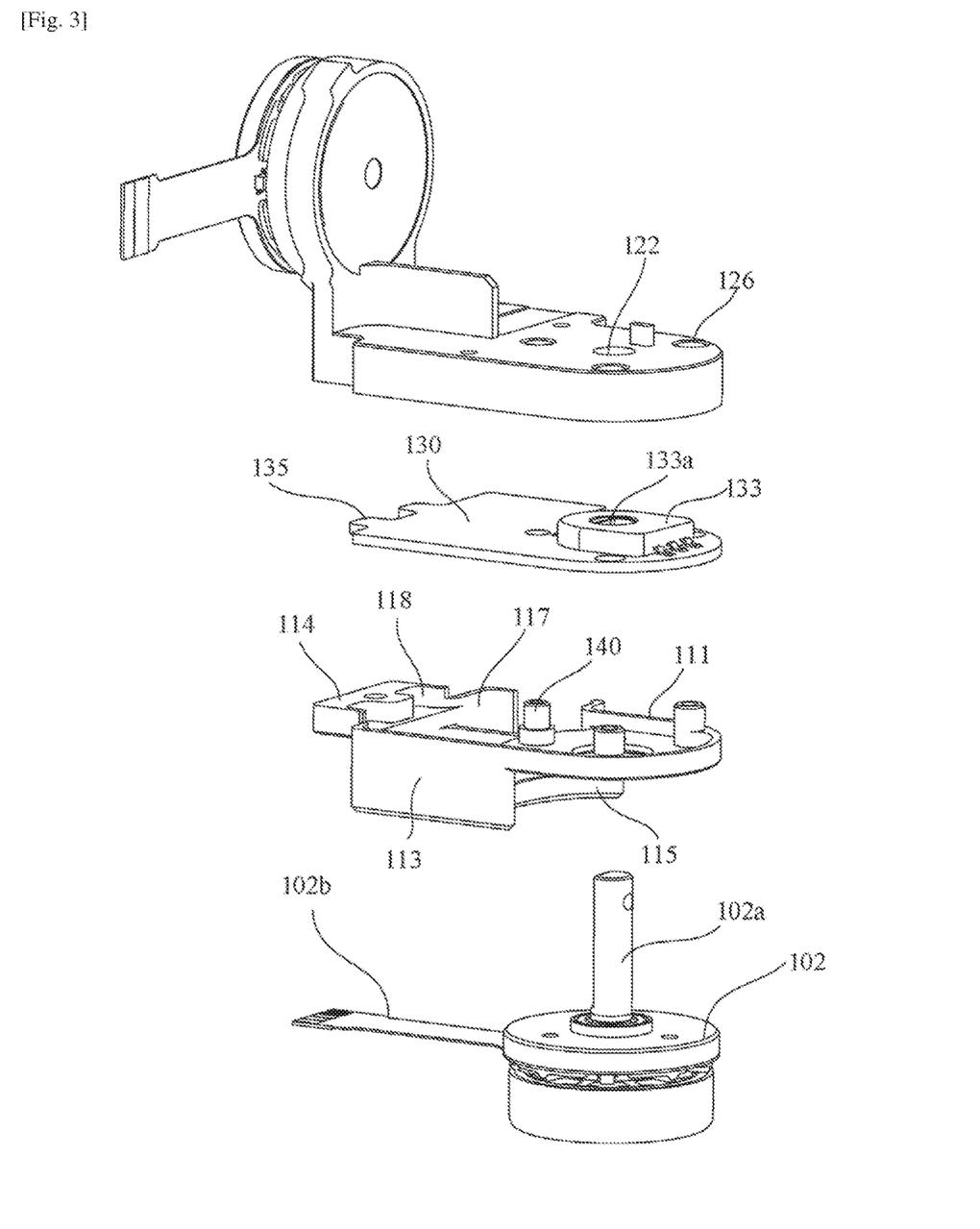
FIG. 3 is an exploded view from another perspective of the rotary shaft mechanism of the gimbal platform as shown in FIG. 1.

Reference is made to FIGS. 2 and 3, wherein the rear cover 110 is provided with an upper fitting face 111 and a first shaft hole 112. The first shaft hole 112 is used for allowing an object to be sensed to pass therethrough, specifically, in the embodiment illustrated, the first shaft hole 112 is used for allowing the drive shaft 102a of the first motor 102 to pass therethrough.

It should be noted that the first shaft hole 112 may also be omitted, in which case, the bottom part of the first motor 102 away from the drive shaft 102a is fixed on the rear cover 110.

The specific structure of the rear cover 110 can be designed according to various requirements, for example, in the embodiment illustrated, the rear cover 110 comprises an upper cover body 113 and an upper fixing part 114, and the upper fixing part 114 is provided at one end of the upper cover body 113 for a fixed connection to the bracket 120. Specifically, the upper fixing part 114 is fixedly connected to the bracket 120 via a threaded fastener.

Further, the rear cover 110 is provided with a stepped part 115 for mounting the first motor 102, specifically, the stepped part 115 is provided at the end of the upper cover body 113 of the rear cover 110 which is away from the fixing part 114. The stepped part 115 is provided on the surface of the rear cover 110 which is away from the sensor mounting plate 130, i.e. the stepped part 115 and the sensor mounting plate 130 are arranged to face away from each other. The first shaft hole 112 is provided at the bottom part of the stepped part 115.

The shape of the stepped part 115 can be designed according to various requirements, for example, in the embodiment illustrated, the stepped part 115 comprises a bottom face 115a and a side face 115b connected perpendicularly to the bottom face 115a, a first shaft hole 112 is provided on the bottom face 115a, and the shape of the side face 115b matches the shape of the periphery of the first motor 102. For example, the periphery of the first motor 102 is circular, and the shape of the side face 115b is arc-shaped.

Further, the side face 115b is provided with a threading hole 116 for a flexible circuit board 102b to pass therethrough, the flexible circuit board 102b being used for electrically connecting to the first motor 102.

Further, the height at which the bottom face 115a is located is lower than the height of the rear cover 110, so that after the first motor 102 is mounted on the stepped part 115, the overall structure of the gimbal platform 100 is relatively compact. Specifically, in the embodiment illustrated, the stepped part 115 extends in a recessed manner from a surface of the upper cover body 113 facing away from the sensor mounting plate 130, so that the height at which the bottom face 115a is located is significantly lower than the overall height of the upper cover body 113.

Figure 5:
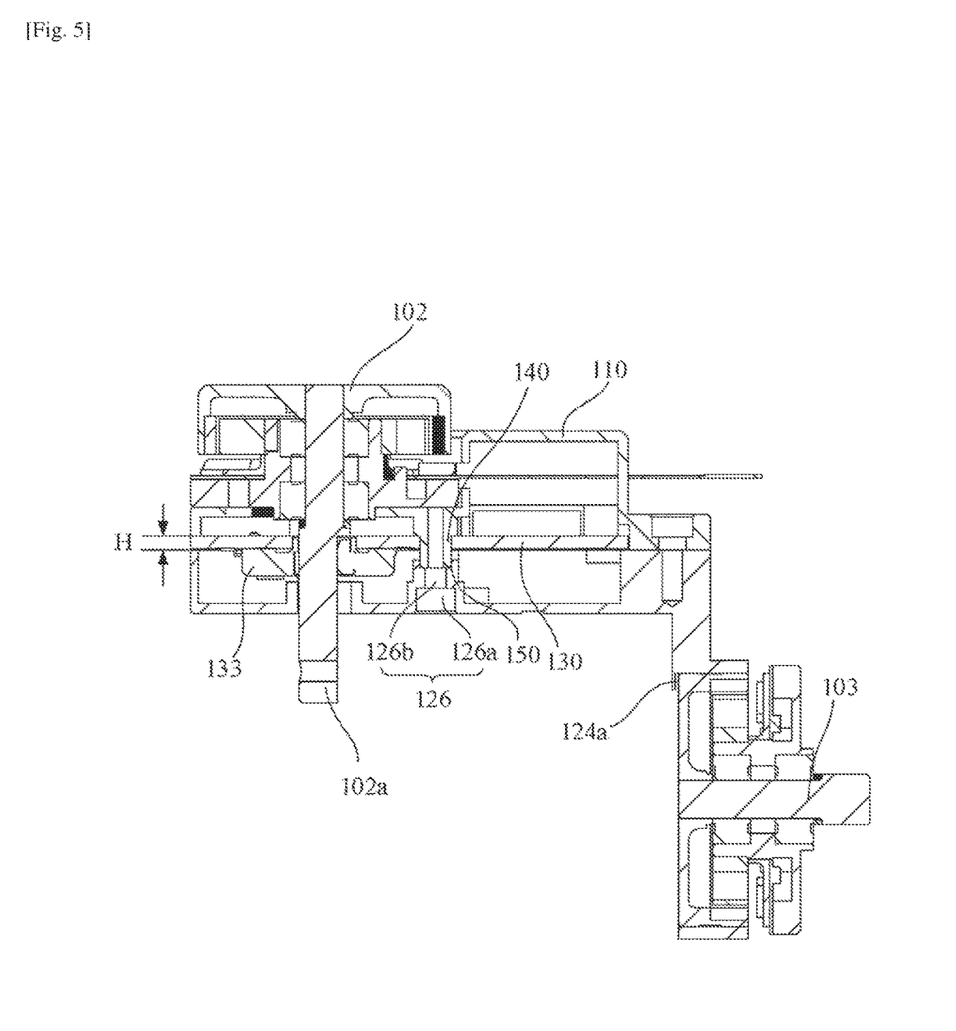
FIG. 5 is a sectional view taken along a line B-B in FIG. 4.

The bracket 120 is provided with a lower fitting face 121 and a second shaft hole 122. The lower fitting face 121 and the upper fitting face 111 are arranged to face each other and spaced at a pre-set spacing H from each other, as shown in FIG. 5. The second shaft hole 122 corresponds to the first shaft hole 112. The second shaft hole 122 is used for allowing the object to be sensed to pass therethrough, specifically, in the embodiment illustrated, the second shaft hole 122 is used for allowing the drive shaft 102a of the first motor 102 to pass therethrough.

It should be noted that the second shaft hole 122 may be omitted, in which case, the drive shaft 102a of the first motor 102 runs through at an edge of the bracket 120.

The specific structure of the bracket 120 can be designed according to various requirements, for example, in the embodiment illustrated, the bracket 120 comprises a first support arm 123 and a second support arm 124 connected fixedly and perpendicularly to one end of the first support arm 123, and the first support arm 123 and the rear cover 110 are arranged to face each other.

Further, the first support arm 123 comprises a lower cover body 123a and a lower fixing part 123b, and the lower fixing part 123b is provided at one end of the lower cover body 123a and is fixedly connected to the second support arm 124. The lower fixing part 123b is fixedly connected to the upper fixing part 114 via a threaded fastener. The lower cover body 123a and the upper cover body 113 are arranged to face each other and spaced apart from each other.

Further, a motor mounting part 124a for mounting the second motor 103 is provided on the second support arm 124. Specifically, in the embodiment illustrated, the motor mounting part 124a is a mounting groove on the second support arm 124, and the shape of the mounting groove matches the shape of the bottom part of the second motor 103.

The upper fitting face 111 and the lower fitting face 121 together form a pre-set space for mounting the sensor mounting plate 130, and the sensor mounting plate 130 is movable in the pre-set space.

The upper fitting face 111 and the lower fitting face 121 may be formed in an open space, and the edge of the sensor mounting plate 130 may be exposed outside the rear cover 110 and the bracket 120. For example, in the embodiment illustrated, the rear cover 110 is provided with an upper accommodating groove 117, specifically, the upper accommodating groove 117 is provided on the upper cover body 113 of the rear cover 110; and the bracket 120 is provided with a lower accommodating groove 125, specifically, the lower accommodating groove 125 is provided on the lower cover body 123a of the first support arm 123. The lower accommodating groove 125 and the upper accommodating groove 117 are arranged to face each other. The upper fitting face 111 is provided on the periphery of an opening of the upper accommodating groove 117, and the lower fitting face 121 is provided on the periphery of an opening of the lower accommodating groove 125.

The upper fitting face 111 and the lower fitting face 121 may be formed in a sealed space, and the sensor mounting plate 130 may be accommodated in the sealed space. For example, in one embodiment, the rear cover 110 is provided with an upper accommodating groove 117, specifically, the upper accommodating groove 117 is provided on the upper cover body 113 of the rear cover 110; and the bracket 120 is provided with a lower accommodating groove 125, specifically, the lower accommodating groove 125 is provided on the lower cover body 123a of the first support arm 123. The lower accommodating groove 125 and the upper accommodating groove 117 are arranged to face each other. The upper fitting face 111 is provided at the bottom part of the upper accommodating groove 117, and the lower fitting face 121 is provided at the bottom part of the lower accommodating groove 125. The lower accommodating groove 125 and the upper accommodating groove 117 together form an accommodating cavity for accommodating the sensor mounting plate 130.

The sensor mounting plate 130 is used for mounting an angle sensor 133. The sensor mounting plate 130 is provided with a third shaft hole 131 corresponding to the first shaft hole 112 and the second shaft hole 122. The sensor mounting plate 130 is provided between the upper fitting face 111 of the rear cover 110 and the lower fitting face 121 of the bracket 120. The pre-set spacing H is greater than the thickness d of the sensor mounting plate 130, such that the sensor mounting plate 130 is movable between the upper fitting face 111 and the lower fitting face 121.

It should be noted that the third shaft hole 131 may also be omitted, in which case, the angle sensor 133 is arranged close to the edge of the sensor mounting plate 130.

The sensor mounting plate 130 may be a circuit board, specifically, in the embodiment illustrated, the circuit board is further provided with a control circuit for controlling the rotation angle of the drive shaft 102a of the first motor 102. For example, the sensor mounting plate 130 is an electronic speed control board.

The sensor mounting plate 130 may also be an insulating plate, for example, the sensor mounting plate 130 may be a flat plate made of an insulating plastic.

The connection of the sensor mounting plate 130 with the rear cover 110 and the bracket 120 can be designed according to various requirements, for example, in the embodiment illustrated, the rear cover 110 is fixedly connected to the bracket 120 via a connecting shaft 140. The sensor mounting plate 130 is provided with a limiting hole 132, and the connecting shaft 140 passes through the limiting hole 132. Specifically, the dimension of the limiting hole 132 is greater than the dimension of the cross section of the connecting shaft 140, so that the sensor mounting plate 130 is movably sheathed on the connecting shaft 140.

In other embodiments, the edges of the upper cover body 113 of the rear cover 110 and the lower cover body 123a of the bracket 120 are fixedly connected together to form a sealed accommodating cavity, for example, the edges of the upper cover body 113 of the rear cover 110 and the lower cover body 123a of the bracket 120 are snap-fitted together to form a sealed box. The sensor mounting plate 130 is mounted in the accommodating cavity and is movable therein.

In another embodiment, the edges of the upper cover body 113 of the rear cover 110 and the lower cover body 123a of the bracket 120 are fixedly connected together to form a sealed accommodating cavity. Moreover, the rear cover 110 is fixedly connected to the bracket 120 via the connecting shaft 140, and the connecting shaft 140 is located in the accommodating cavity. The connecting shaft 140 passes through the limiting hole 132 such that the sensor mounting plate 130 is movably sheathed on the connecting shaft 140 and at the same time is accommodated in the accommodating cavity and is movable therein.

Figure 4:
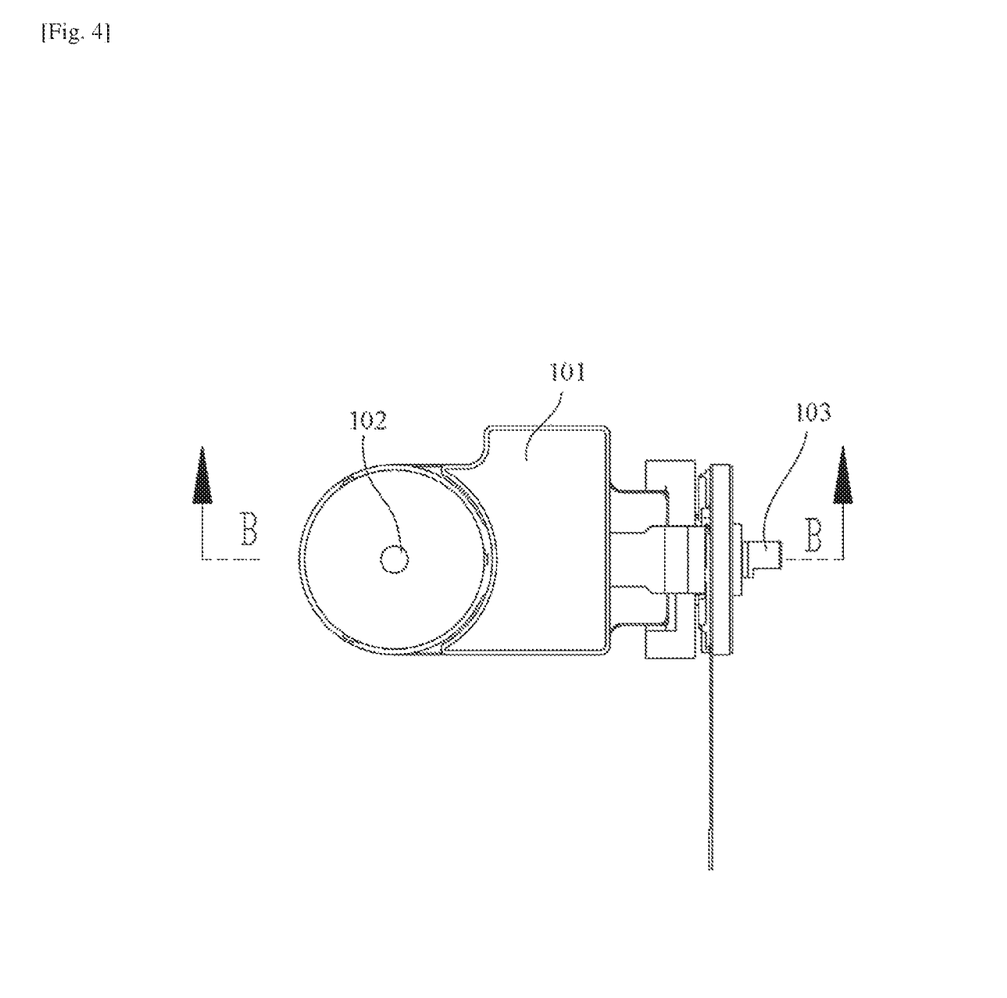
FIG. 4 is a top view of the rotary shaft mechanism of the gimbal platform as shown in FIG. 1.

Reference is further made to FIGS. 4 and 5, where the specific structure of the connecting shaft 140 may be designed according to actual needs, for example, in the embodiment illustrated, the connecting shaft 140 is a positioning post 140 provided on one of the rear cover 110 and the bracket 120, the other of the rear cover 110 and the bracket 120 is provided with a positioning hole 150, and the positioning post 140 is fitted with the positioning hole 150, so as to facilitate the accurate matching connection of the rear cover 110 and the bracket 120.

Further, the connecting shaft 140 abuts against the bottom part of the positioning hole 150, so as to ensure the pre-set spacing H between the rear cover 110 and the bracket 120.

Further, an end face of the connecting shaft 140 is provided with a threaded hole, and a threaded fastener passes through the positioning hole 150 to screw into the threaded hole of the connecting shaft 140, so as to connect the rear cover 110 fixedly to the bracket 120.

The specific structure of the positioning hole 150 and the connecting shaft 140 can be designed according to various requirements, for example, in the illustrated embodiment, the positioning post 140 is provided on the upper cover body 110 of the rear cover 113; specifically, the positioning post 140 is a cylinder. A positioning barrel is provided on the lower cover body 123a of the first support arm 123 of the bracket 120, and the positioning hole 150 is the central hole of the positioning barrel.

Further, the number of connecting shafts 140 is at least three, which are respectively arranged around the first shaft hole 112 of the upper cover body 113 of the rear cover 110. The number of positioning holes 150 is at least three, which are respectively arranged around the second shaft hole 122 of the lower cover body 123a of the first support arm 123 of the bracket 120. Since a triangular distribution has a better stability, the number of connecting shafts 140 is set to be not less than three, so as to increase the positioning precision between the rear cover 110 and the bracket 120 and the strength of the connection.

Further, the lower cover body 123a of the first support arm 123 of the bracket 120 is provided with a through hole 126 in communication with the positioning hole 150, the through hole 126 communicates with the positioning hole 150, and the threaded fastener passes through the through hole 126 and the positioning hole 150 in sequence to screw into the threaded hole of the connecting shaft 140.

Further, the through hole 126 is a stepped hole, which comprises a larger end 126a and a smaller end 126b in communication with the larger end 126a. The larger end 126a is located at one side of the lower cover body 123a facing away from the positioning barrel, and the smaller end 126b is in communication with the positioning hole 150. The threaded fastener may be a screw, and the cap of the screw is accommodated in the larger end 126a of the through hole 126.

In order to enable the sensor mounting plate 130 to be movable between the rear cover 110 and the bracket 120, there is a pre-set gap between the sensor mounting plate 130 and the rear cover 110 and/or the bracket 120. For example, the size of the pre-set gap is equivalent to the difference of the pre-set spacing H between the upper fitting face 111 of the rear cover 110 and the lower fitting face 121 of the bracket 120 relative to the thickness d of the sensor mounting plate 130. In some embodiments, the pre-set gap may be 0.1 mm to 0.2 mm.

Alternatively, the angle sensing device 101 further comprises an elastic member which abuts between the sensor mounting plate 130 and the rear cover 110 and/or the bracket 120. The sensor mounting plate 130 presses the elastic member to make the elastic member elastically deformed, so as to provide an avoidance space for the movement of the sensor mounting plate 130.

The specific structure of the elastic member can be designed according to various requirements, for example, the elastic member is an elastic rubber mat, an elastic rubber ring, a sponge mat or a sponge ring, etc. clamped between the sensor mounting plate 130 and the rear cover 110 and/or the bracket 120.

The elastic member may seal off the pre-set gap between the sensor mounting plate 130 and the rear cover 110 and/or the bracket 120, or partially fills the pre-set gap between the sensor mounting plate 130 and the rear cover 110 and/or the bracket 120.

Further, reference is again made to FIGS. 2 and 3, wherein the rear cover 110 is provided with a limiting part 118, the sensor mounting plate 130 is provided with a fitting part 135, and the limiting part 118 is fitted with the fitting part 135 so as to limit a rotation angle of the sensor mounting plate 130 between the bracket 120 and the rear cover 110. Specifically, in the embodiment illustrated, the limiting part 118 is provided at the upper fixing part 114 of the rear cover 110, and the fitting part 135 is provided at an edge of the sensor mounting plate 130.

The specific structure of the limiting part 118 and the fitting part 135 can be designed according to various requirements, for example, in the embodiment illustrated, the limiting part 118 is a limiting groove provided in the rear cover 110, and the fitting part 135 is a fitting boss provided on an edge of the sensor mounting plate 130. In other embodiments, the limiting part 118 is a limiting boss provided on the rear cover 110, and the fitting part 135 is a stopping boss provided on an edge of the sensor mounting plate 130. There may be a plurality of limiting bosses, and the limiting bosses are each located between two adjacent limiting bosses.

The angle sensor 133 is arranged close to the drive shaft 102a of the first motor 102 and is used for sensing the rotation angle of the drive shaft 102a of the first motor 102. The angle sensor 133 may be a potentiometer, a Hall sensor, etc.

The angle sensor 133 is further provided with a detection hole 133a for the drive shaft 102a of the first motor 102 to pass therethrough, and the detection hole 133a corresponds to all of the first shaft hole 112 of the rear cover 110, the second shaft hole 122 of the bracket 120 and the third shaft hole 131 of the sensor mounting plate 130. Specifically, in the embodiment illustrated, the angle sensor 133 is a potentiometer having a detection hole 133a.

Further, the drive shaft 102a of the first motor 102 is provided with a positioning plane 102c. The positioning plane 102c extends axially in parallel to the drive shaft 102a of the first motor 102. The detection hole 133a of the potentiometer is an irregularly shaped hole matching the shape of the drive shaft 102a.

Further, the sensor mounting plate 130 is provided with a wiring terminal 136 for electrically connecting to an external connector, and the rear cover 110 is provided with a wiring notch 119 corresponding to the wiring terminal 136 for allowing the external connector to pass therethrough and to be inserted into the wiring notch 119 to mate with the wiring terminal 136.

The sensor mounting plate 130 of the above-mentioned angle sensing device 101 is provided between the rear cover 110 and the bracket 120, and the sensor mounting plate 130 is movable between the rear cover 110 and the bracket 120. When there is interference between the drive shaft 102a of the motor of the gimbal platform 100 and the angle sensor 133 on the sensor mounting plate 130, for example, when the drive shaft 102a of the motor of the gimbal platform 100 is not concentric with the detection hole 133a of the angle sensor 133 on the sensor mounting plate 130, the sensor mounting plate 130 can be adjusted according to the actual error, so as to reduce the stress between the drive shaft 102a of the motor and the angle sensor 133 on the sensor mounting plate 130, and avoid the problems of non-smooth rotation of the motor and adverse effects on positioning precision, etc., so that there is no need to add a specific station to adjust the positioning precision between the drive shaft 102a of the motor and the angle sensor 133, thus reducing the production costs of the gimbal platform 100.

Figure 6:
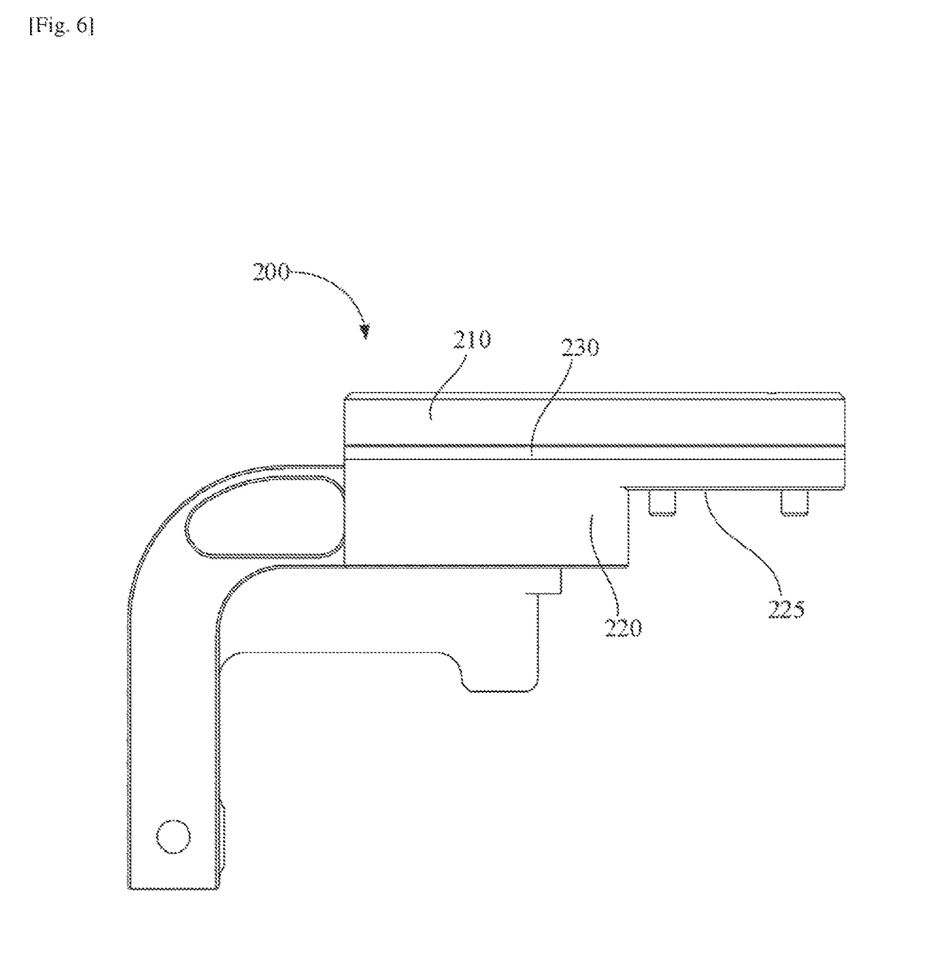
FIG. 6 is a structural schematic view of a rotary shaft mechanism of a gimbal platform of a second embodiment of the present disclosure.

Reference is further made to FIG. 6, wherein the gimbal platform 200 of the second embodiment of the present disclosure is basically similar to the gimbal platform 100 of the first embodiment, and the difference lies in that the rotary shaft mechanism of the gimbal platform 200 of the second embodiment of the present disclosure is a roll shaft. The sensor mounting plate 230 of the rotary shaft mechanism of the gimbal platform 200 is provided between the rear cover 210 and the bracket 220, and the pre-set spacing between the rear cover 210 and the bracket 220 is greater than the thickness of the sensor mounting plate 230. The bracket 220 is provided with a motor mounting part 225 for mounting a motor.

It should be noted that the gimbal platform 100, 200 can also contain both the above-mentioned pitch shaft and roll shaft.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being identified by the following claims. It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. An angle sensing device, comprising:
   a rear cover including an upper fitting face;
   a bracket including a lower fitting face, the lower fitting face and the upper fitting face being arranged to face each other and spaced apart from each other by a pre-set spacing; and
   a sensor mounting plate for mounting an angle sensor and provided between the upper fitting face and the lower fitting face, the sensor mounting plate including a circuit board with a control circuit for controlling a rotation angle of a drive shaft of a motor,
   wherein the pre-set spacing is greater than a thickness of the sensor mounting plate, such that the sensor mounting plate is movable between the upper fitting face and the lower fitting face.

2. The angle sensing device according to claim 1, wherein the rear cover includes a stepped part for mounting a motor, and the stepped part is arranged to face away from the sensor mounting plate.

3. The angle sensing device according to claim 1, wherein the rear cover includes a limiting part, the sensor mounting plate includes a fitting part, and the limiting part is fitted with the fitting part to limit a rotation angle of the sensor mounting plate between the bracket and the rear cover.

4. The angle sensing device according to claim 3, wherein the limiting part includes a limiting groove provided in the rear cover, and the fitting part includes a fitting boss provided on an edge of the sensor mounting plate.

5. The angle sensing device according to claim 1, wherein the bracket includes:
   a first support arm facing the rear cover; and
   a second support arm connected fixedly and perpendicularly to one end of the first support arm, the second support arm including a motor mounting part for mounting a motor.

6. The angle sensing device according to claim 1, wherein the rear cover includes an upper accommodating groove, the bracket includes a lower accommodating groove, and the lower accommodating groove and the upper accommodating groove are arranged to face each other.

7. The angle sensing device according to claim 6, wherein the upper fitting face is provided at a bottom part of the upper accommodating groove, the lower fitting face is provided at a bottom part of the lower accommodating groove, and the lower accommodating groove and the upper accommodating groove together form an accommodating cavity for accommodating the sensor mounting plate.

8. The angle sensing device according to claim 6, wherein the upper fitting face is provided on a periphery of an opening of the upper accommodating groove, and the lower fitting face is provided on a periphery of an opening of the lower accommodating groove.

9. A gimbal platform, comprising:
   an angle sensing device of claim 1; and
   a motor mounted on the rear cover,
   wherein the angle sensor is arranged close to a drive shaft of the motor and configured to sense a rotation angle of the drive shaft of the motor.

10. An angle sensing device, comprising:
    a rear cover;
    a bracket arranged to face the rear cover and fixedly connected to the rear cover via a connecting shaft; and
    a sensor mounting plate for mounting an angle sensor and provided between the rear cover and the bracket, the sensor mounting plate including a limiting hole,
    wherein the connecting shaft passes through the limiting hole such that the sensor mounting plate is movably sheathed on the connecting shaft.

11. The angle sensing device according to claim 10, wherein the sensor mounting plate includes a circuit board including a control circuit for controlling a rotation angle of a drive shaft of a motor.

12. The angle sensing device according to claim 10, wherein the rear cover includes a stepped part for mounting a motor, and the stepped part is arranged to face away from the sensor mounting plate.

13. The angle sensing device according to claim 10, wherein the rear cover includes a limiting part, the sensor mounting plate includes a fitting part, and the limiting part is fitted with the fitting part to limit a rotation angle of the sensor mounting plate between the bracket and the rear cover.

14. The angle sensing device according to claim 13, wherein the limiting part includes a limiting groove provided in the rear cover, and the fitting part includes a fitting boss provided on an edge of the sensor mounting plate.

15. The angle sensing device according to claim 10, wherein the bracket includes:
    a first support arm facing the rear cover; and
    a second support arm connected fixedly and perpendicularly to one end of the first support arm, the second support arm including a motor mounting part for mounting a motor.

16. A gimbal platform, comprising:
    an angle sensing device of claim 15; and
    a motor mounted on the rear cover,
    wherein the angle sensor is arranged close to a drive shaft of the motor and configured to sense a rotation angle of the drive shaft of the motor.

17. The angle sensing device according to claim 10, wherein the rear cover and the bracket together form an accommodating cavity for accommodating the sensor mounting plate, and the connecting shaft is located in the accommodating cavity.

18. The angle sensing device according to claim 10, wherein the rear cover and the bracket are arranged to face each other and spaced apart from each other.

19. The angle sensing device according to claim 10, further comprising:
an elastic member abutting between the sensor mounting plate and at least one of the rear cover or the bracket.

* * * * *